United States Patent
Chang et al.

(10) Patent No.: US 8,165,208 B2
(45) Date of Patent: Apr. 24, 2012

(54) METHOD AND APPARATUS FOR DETECTING SAWTOOTH AND FIELD MOTION

(75) Inventors: Ching-Hua Chang, Taipei Hsien (TW); Po-Wei Chao, Taipei Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1288 days.

(21) Appl. No.: 11/838,871

(22) Filed: Aug. 14, 2007

(65) Prior Publication Data

US 2008/0043142 A1 Feb. 21, 2008

(30) Foreign Application Priority Data

Aug. 16, 2006 (TW) .............................. 95130139 A

(51) Int. Cl.
*H04N 11/20* (2006.01)

(52) U.S. Cl. .................. 375/240.16; 348/351; 348/352

(58) Field of Classification Search .................. None
See application file for complete search history.

(56) References Cited

U.S. PATENT DOCUMENTS

| | | | |
|---|---|---|---|
| 5,153,719 A | 10/1992 | Ibenthal | |
| 5,291,280 A * | 3/1994 | Faroudja et al. | 375/240.12 |
| 5,625,421 A | 4/1997 | Faroudja et al. | |
| 5,631,706 A | 5/1997 | Tsunashima | |
| 5,689,301 A | 11/1997 | Christopher et al. | |
| 5,861,924 A | 1/1999 | Pan | |
| 6,014,182 A | 1/2000 | Swartz | |
| 6,201,577 B1 | 3/2001 | Swartz | |
| 6,580,463 B2 | 6/2003 | Swartz | |
| 7,098,957 B2 * | 8/2006 | Kim et al. | 348/452 |
| 7,224,399 B2 * | 5/2007 | Song | 348/452 |
| 2002/0008785 A1 | 1/2002 | Yamaguchi | |
| 2003/0095205 A1 | 5/2003 | Orlick | |
| 2005/0078215 A1 | 4/2005 | Swartz | |
| 2005/0117067 A1 * | 6/2005 | Chao | 348/700 |
| 2005/0219408 A1 | 10/2005 | Yang | |
| 2006/0139485 A1 * | 6/2006 | Kim et al. | 348/441 |
| 2006/0164559 A1 * | 7/2006 | Chou et al. | 348/700 |

FOREIGN PATENT DOCUMENTS

| | | |
|---|---|---|
| CN | 1071074 C | 9/2001 |
| EP | 0687105 A2 | 12/1995 |

* cited by examiner

*Primary Examiner* — Mehrdad Dastouri
*Assistant Examiner* — Mohammed Rahaman
(74) *Attorney, Agent, or Firm* — Winston Hsu; Scott Margo

(57) ABSTRACT

The present invention provides a video detecting device including a first pixel detector, a second pixel detector, and a determining unit. The first pixel detector compares the intensity of a target pixel of a target scan line in a first field with the intensity of first comparing pixels of scan lines corresponding to the target scan line in a second field to generate a first detection value corresponding to the target pixel. The second pixel detector compares the intensity of a reference pixel of a nearby scan line in the second field with the intensity of second comparing pixels of scan lines corresponding to the nearby scan line in the first field to generate a second detection value corresponding to the reference pixel. According to the first and second detection values, the determining unit generates a diagnostic value which helps determine sawtooth occurrences in video frames.

20 Claims, 3 Drawing Sheets

METHOD AND APPARATUS FOR DETECTING SAWTOOTH AND FIELD MOTION

BACKGROUND OF THE INVENTION

1. Field of the Invention

The present invention relates to a video detecting device and a method thereof, and more particularly, to a video detecting device and method for detecting sawtooth and field motion.

2. Description of the Prior Art

Conventional interlaced scan techniques display odd scan lines and even scan lines in an image frame one after the other when displaying the image frame. Hence, each frame is actually composed of two interlaced fields—one odd field composed of the odd scan lines and one even field composed of the even scan lines.

The modern progressive scan technique, also called the non-interlaced scan, however, merges two fields into a frame, and then sequentially scans the frame at a doubled horizontal scan frequency thereby increasing the stability and precision of the appearance of a picture.

Since there may be a time difference between images of different fields, detecting if there is image motion between two fields that are to be merged (i.e. field motion) before merging the fields into the frame is an important task. If field motion does exist between the two fields, sawtooth will appear in the frame when merging the fields into the frame, thereby deteriorating picture quality.

The detecting method for detecting field motion and sawtooth in a conventional video detecting device usually cannot identify the variations in dynamics and static in high-frequency regions precisely, such as that proposed in the U.S. patent of application Ser. No. 10/904,454. Therefore, the precision of the output picture in high-frequency circumstances is greatly influenced.

SUMMARY OF THE INVENTION

One objective of the claimed invention is therefore to provide a video detecting device and a method thereof. The invention determines sawtooth occurrences or field motion regarding a frame composed of fields in order to solve the above problems.

According to an exemplary embodiment of the claimed invention, a video detecting device is proposed. The video detecting device comprises a first pixel detector, a second pixel detector and a determining unit. The first pixel detector is for comparing intensity of a target pixel of a target scan line in a first field with intensity of a plurality of first comparing pixels of a first scan line and a second scan line corresponding to the target scan line in a second field, to generate a first detection value corresponding to the target pixel, wherein the target scan line is between the first scan line and the second scan line. The second pixel detector is for comparing intensity of a reference pixel of the first scan line in the second field with intensity of a plurality of second comparing pixels of a third scan line corresponding to the first scan line and the target scan line in the first field, to generate a second detection value corresponding to the reference pixel, wherein the first scan line is between the target scan line and the third scan line. The determining unit is coupled to the first pixel detector and the second pixel detector, and is for generating a diagnostic value according to the first detection value and the second detection value.

According to an exemplary embodiment of the claimed invention, a video detecting method is proposed. The video detecting method comprises comparing intensity of a target pixel of a target scan line in a first field with intensity of a plurality of first comparing pixels of a first scan line and a second scan line corresponding to the target scan line in a second field, to generate a first detection value corresponding to the target pixel, wherein the target scan line is between the first scan line and the second scan line; comparing intensity of a reference pixel of the first scan line in the second field with intensity of a plurality of second comparing pixels of a third scan line corresponding to the first scan line and the target scan line in the first field, to generate a second detection value corresponding to the reference pixel, wherein the first scan line is between the target scan line and the third scan line; and generating a diagnostic value according to the first detection value and the second detection value.

The exemplary video detecting device of the present invention not only detects sawtooth concerning the target pixel, but also selects a pixel(s) in a nearby region as a reference pixel. Therefore the present invention can precisely identify dynamic and static variations in high-frequency regions, therefore raising the precision of the output picture in high-frequency situations.

These and other objectives of the present invention will no doubt become obvious to those of ordinary skill in the art after reading the following detailed description of the preferred embodiment that is illustrated in the various figures and drawings.

DETAILED DESCRIPTION

The embodiments disclosed in the following paragraphs can be implemented by analog or digital signal processing, or techniques combining analog and digital signal processing. Nevertheless, the digital signal processing can also be implemented by software.

Figure 1:
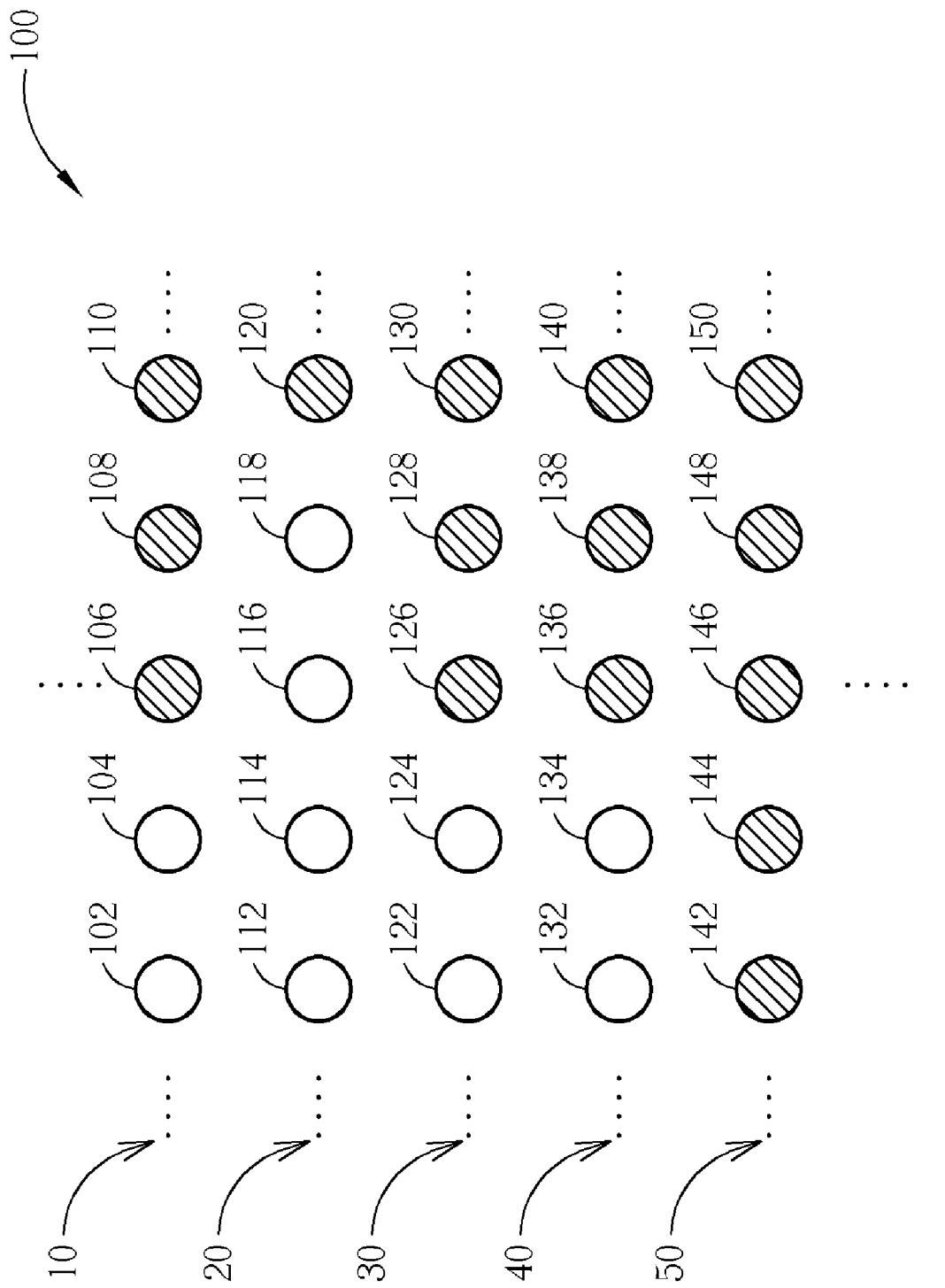
FIG. 1 is a diagram of a frame.

Please refer to FIG. 1, which is a diagram of a frame 100. The frame 100 is formed by interlacing a first field $F_n$ and a second field $F_{n-1}$, where the horizontal scan lines of the first field $F_n$ include scan lines 10, 30, 50, etc., and the horizontal scan lines of the second field $F_{n-1}$, which is prior to the first field $F_n$ in this embodiment, include scan lines 20, 40, etc. Pixels 102, 104, . . . , 148 and 150 are some of the pixels belonging to the frame 100.

Figure 2:
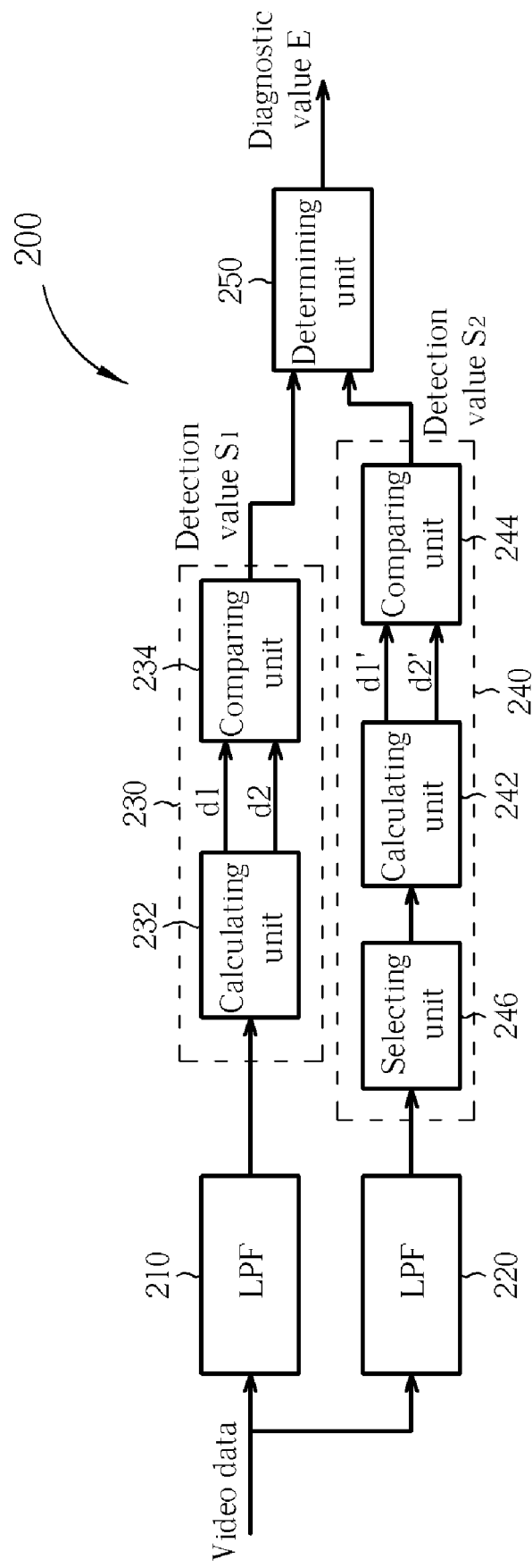
FIG. 2 is a block diagram of a video detecting device according to an exemplary embodiment of the invention.

Please refer to FIG. 2. FIG. 2 is a block diagram of a video detecting device 200 illustrated according to an exemplary embodiment of the invention. The video detecting device 200 includes a plurality of low-pass filters (LPFs) 210, 220 (two in this embodiment), a target pixel detector 230, a reference pixel detector 240, and a determining unit 250. The target pixel detector 230 includes a calculating unit 232 and a comparing unit 234, while the reference pixel detector 240 includes a calculating unit 242, a comparing unit 244, and a selecting unit 246. In this embodiment, the LPFs 210, 220 provide low-pass filtering of the video data entering the target pixel detector 230 and the reference pixel detector 240 to filter out noise interference. However, if the resolution of the video data already exceeds a certain value, the LPFs 210, 220 in the video detecting device 200 are no longer necessary. Relevant modifications regarding this issue should also fall within the scope of the invention. The video data to be received by the video detecting device 200 can be monochrome video signals or component video signals in analog or digital format, such as RGB, Y/I/Q, Y/U/V, Y/R-Y/B-Y and Y/Cr/Cb. After the noise is rejected with the LPFs 210, 220, the video data enters the target pixel detector 230 and the reference pixel detector 240. The calculating unit 232 of the target pixel detector 230 provides calculations of the differences between the intensity (e.g. brightness or chrominance) of a target pixel of a target scan line and the intensity of a plurality of comparing pixels of adjacent scan lines. For example, suppose that the video detecting device 200 performs pixel detection on the target pixel 126 of the target scan line 30 as depicted in FIG. 1. As mentioned above, the calculating unit 232 calculates the intensity difference d1 between the target pixel 126 and the comparing pixel 116 residing above the target scan line 30, and calculates the intensity difference d2 between the target pixel 126 and the comparing pixel 136 residing below the target scan line 30, and transmits the intensity differences d1, d2 to the comparing unit 234. Then, the comparing unit 234 arbitrates the received intensity differences to generate a detection value S1 corresponding to the target pixel 126. For example, when the intensity differences d1, d2 received are not equal to zero and have opposite signs, the comparing unit 234 may output a logic signal 1, implying sawtooth occurrences between the target pixel 126 and the comparing pixels 116, 136, whereas in other situations, the comparing unit 234 outputs a logic signal 0 instead.

Please note that in the embodiments of the present invention, the target pixel detector 230 can be implemented by any other detecting device in order to meet different design requirements. For example, the target pixel detector 230 can be implemented by the video detecting device disclosed in the U.S. patent of application Ser. No. 10/904,454. As mentioned above, the target pixel detector 230 of the video detecting device 200 performs the detecting procedure by comparing the target pixel 126 with the pixels 116 and 136 residing above and below the target pixel 126. However, in some specific conditions, the comparing range may be too small to precisely detect sawtooth occurrences regarding the target pixel. In this embodiment, for instance, the comparing unit 234 does not detect the so-called sawtooth in between the target pixel 126 and the comparing pixels 116, 136, despite that sawtooth did appear in between the target pixel 126 and the adjacent pixels (e.g. pixel 106, 116, and 126). Therefore, in order to increase the sensitivity of the video detecting device 200 concerning sawtooth detection, the reference pixel detector 240 is incorporated into the video detecting device 200 in order to assist the target pixel detector 230 in the objective of determining sawtooth occurrences more precisely.

Hence, when the reference pixel detector 240 receives the video data from the LPF 220, the selecting unit 246 of the reference pixel detector 240 selects a reference pixel from the region adjacent to the target pixel 126. In this embodiment, the selecting unit 246 can select the pixel 116 located above the target pixel 126 as the reference pixel. Next, the calculating unit 242 calculates the intensity difference d1' between the reference pixel 116 and the comparing pixel 106 located above the reference scan line 20, and calculates the intensity difference d2' between the reference pixel 116 and the target pixel 126 located below the reference scan line 20, and transmits the intensity differences d1', d2' to the comparing unit 244. The comparing unit 244 arbitrates the received intensity differences and generates a detection value S2 corresponding to the reference pixel 116. For example, when the intensity differences d1', d2' received are not equal to zero and have opposite signs, the comparing unit 244 can output a logic signal 1, implying sawtooth occurrences between the reference pixel 116 and the comparing pixels 106, 126, whereas in other situations, a logic signal 0 is outputted instead.

As mentioned above, the main function of the reference pixel detector 240 is to select the reference pixel 116 in the region adjacent to the target pixel 126, and perform additional sawtooth detection according to the reference pixel 116. Then the determining unit 250 of the video detecting device 200 further determines if any sawtooth regarding the target pixel 126 appeared by referring to the detection values S1, S2 transmitted from the comparing units 234, 244. In practice, the determining unit 250 can perform a logic operation according to the logic value of the detection values S1, S2. In this embodiment, for instance, if the detecting result of the target pixel detector 230 suggests that no sawtooth concerning target pixel 126 appeared, i.e. the detection value S1 is '0', whereas the detecting result of the reference pixel detector 240 suggests that sawtooth concerning reference pixel 116 did appear, i.e. the detection value S2 is '1'. Then, the determining unit 250 can perform an OR logic operation on the detection values to decide whether the final output diagnostic value E is '1', that is if so, the detecting result of the video detecting unit 200 is that sawtooth did occur, regarding the target pixel 126. However, this is not meant to be a limitation of the logic operation to be performed by the determining unit 250 of the invention, since the logic operation performed by the determining unit 250 can be AND, NOR, XOR, . . . etc., depending on different requirements in the application.

As mentioned above, the video detecting device 200 not only provides detections regarding the target pixel 126 but also detections regarding the reference pixel 116 selected from an adjacent region of the target pixel 126 for additional assurance. In the above embodiments, although the target pixel detector 230 determines that no sawtooth regarding the target pixel 126 appeared, however, the utilization of the reference pixel detector 240, which additionally selects a reference pixel in the adjacent region of the target pixel 126, repeats the detecting procedure again, and detects sawtooth in the adjacent region of the target pixel 126. Hence, the sensitivity of the video detecting device 200 is highly raised. As can be seen from the above embodiment, the video detecting device 200 detects the target pixel 126 according to the two pixels above the target pixel 126 (i.e., pixels 106 and 116) and one pixel below the target pixel 126 (i.e., pixel 136). However, the selecting method of the video detecting device 200 is not limited to the above examples, that is, the selecting unit 246 of the reference pixel detector 240 can select different reference pixels at the same time to be detected. For example, the selecting unit 246 can select the pixel 136 as a reference pixel as well, and the reference pixel detector 240 can perform the detection on the reference pixel 136 according to the pixel 126 and 146. In this way, the video detecting device 200 can simultaneously detect sawtooth occurrences regarding the target pixel 126 according to the target pixel 126, a pixel residing above (pixel 116) and two pixels (pixels 136 and 146) residing below. Moreover, the video detecting device 200 of the invention can also perform the detection according to the pixels in a diagonal direction, such as the pixels 110, 118, 126 or 134. In such cases, the target pixel detector 230 can perform the detection by referring to the pixels 118, 126, 134, and the reference pixel detector 240 can perform the detection by referring to the pixels 118, 126, 134. Additionally, since the different pixel selecting methods may generate different detection values, the determining unit 250 of the present invention can perform the logic operation on the detection values after receiving many different detection values. In this way, the decision of sawtooth occurrences can be made more precisely. In addition, the determining unit 250 of the video detecting device 200 can also decide whether field motion is present according to the number of occurrences of sawtooth.

Figure 3:
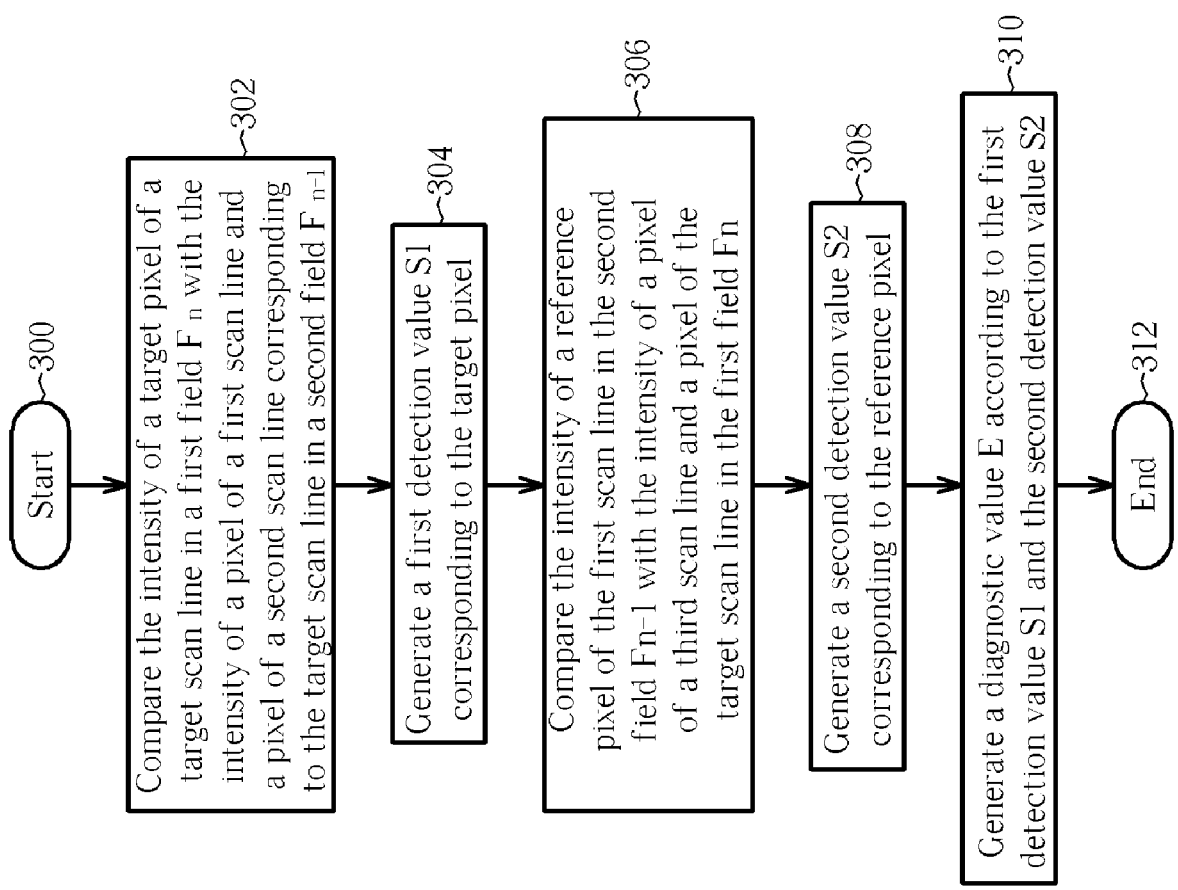
FIG. 3 is a flow chart illustrating the steps of video detection performed by the video detecting device shown in FIG. 2.

Please refer to FIG. 3. FIG. 3 is a flow chart illustrating the steps of video detection performed by the video detecting device 200 shown in FIG. 2. Please note that the related steps in the flow chart need not be performed in the exact order shown in FIG. 3 or performed successively, that is, other steps can be inserted therein. The steps of video detection performed by the video detecting device 200 can be defined as follows:

Step 300: Start.

Step 302: Compare the intensity of a target pixel 126 of a target scan line 30 in a first field $F_n$ with the intensity of a pixel 116 of a first scan line 20 and a pixel 136 of a second scan line 40 corresponding to the target scan line 30 in a second field $F_{n-1}$.

Step 304: Generate a first detection value S1 corresponding to the target pixel 126.

Step 306: Compare the intensity of a reference pixel 116 of the first scan line 20 in the second field Fn−1 with the intensity of a pixel 106 of a third scan line 10 and a pixel 126 of the target scan line 30 in the first field Fn.

Step 308: Generate a second detection value S2 corresponding to the reference pixel 116.

Step 310: Generate a diagnostic value E according to the first detection value S1 and the second detection value S2.

Step 312: End.

Compared to the conventional methods, the exemplary video detecting device of the present invention not only detects sawtooth concerning the target pixel, but also selects a pixel in a nearby region of the target pixel as a reference pixel. The video detecting device of the present invention can increase the sensitivity and precision of sawtooth detection regarding the target pixel, and identify dynamic and static variations in high-frequency regions in a more precise manner, therefore raising the precision of the output picture in high-frequency situations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video detecting device, comprising:
   a first pixel detector, for generating a first difference between intensity of a target pixel of a target scan line in a first field and intensity of a first comparing pixel of a first scan line corresponding to the target scan line in a second field, and a second difference between intensity of the target pixel with intensity of a second comparing pixel of a second scan line corresponding to the target scan line in the second field, thereby to generate a first detection value corresponding to the target pixel based on the first difference and the second difference, wherein the target scan line is between the first scan line and the second scan line;
   a second pixel detector, for generating a third difference between intensity of a reference pixel of the first scan line in the second field with intensity of a third comparing pixel of a third scan line corresponding to the first scan line and the target scan line in the first field, and a fourth difference between intensity of the reference pixel with intensity of the target pixel of the target scan line in the first field, thereby to generate a second detection value corresponding to the reference pixel based on the third difference and the fourth difference, wherein the first scan line is between the target scan line and the third scan line; and
   a determining unit, coupled to the first pixel detector and the second pixel detector, for generating a diagnostic value according to the first detection value and the second detection value.

2. The video detecting device of claim 1, wherein the diagnostic value determines whether the target pixel correspond to sawtooth occurrences.

3. The video detecting device of claim 1, wherein the diagnostic value determines whether the target pixel correspond to field motion.

4. The video detecting device of claim 2, wherein field motion is determined according to a number of sawtooth occurrences.

5. The video detecting device of claim 1, wherein the second scan line is located above the target scan line and the first scan line is located below the target scan line.

6. The video detecting device of claim 1, wherein the target pixel, the reference pixel, the first, second, and third comparing pixels are in a vertical direction of a frame comprising the corresponding first and second fields.

7. The video detecting device of claim 1, wherein the target pixel, the reference pixel, the first, second, and third comparing pixels are in a diagonal direction of a frame comprising the corresponding first and second fields.

8. The video detecting device of claim 1, wherein the first scan line is located above the target scan line, and the second scan line is located below the target scan line.

9. The video detecting device of claim 1, further comprising:
   a first low-pass filter, coupled to the first pixel detector, for low-pass filtering pixel data before entering the first pixel detector in order to decrease noise interference in the first pixel detector; and
   a second low-pass filter, coupled to the second pixel detector, for low-pass filtering pixel data before entering the second pixel detector, in order to decrease noise interference in the second pixel detector.

10. A video detecting method, comprising the steps of:
   generating a first difference between intensity of a target pixel of a target scan line in a first field and intensity of a first comparing pixel of a first scan line corresponding to the target scan line in a second field, and a second difference between intensity of the target pixel with intensity of a second comparing pixel of a second scan line corresponding to the target scan line in the second field, thereby to generate a first detection value corresponding to the target pixel based on the first difference and the second difference, wherein the target scan line is between the first scan line and the second scan line;
   generating a third difference between intensity of a reference pixel of the first scan line in the second field with intensity of a third comparing pixel of a third scan line corresponding to the first scan line and the target scan line in the first field, and a fourth difference between intensity of the reference pixel with intensity of the target pixel of the target scan line in the first field, thereby to generate a second detection value corresponding to the reference pixel based on the third difference and the fourth difference, wherein the first scan line is between the target scan line and the third scan line; and generating a diagnostic value according to the first detection value and the second detection value.

11. The video detecting method of claim 10, wherein the diagnostic value determines whether the target pixel correspond to sawtooth occurrences.

12. The video detecting method of claim 10, wherein the diagnostic value determines whether the target pixel corresponds to field motion.

13. The video detecting method of claim 11, wherein field motion is determined according to a number of sawtooth occurrences.

14. The video detecting method of claim 10, wherein the second scan line is located above the target scan line, and the first scan line is located below the target scan line.

15. The video detecting method of claim 14, wherein the target pixel, the reference pixel, the first, second, and third comparing pixels are in a vertical direction of a frame comprising the corresponding first and second fields.

16. The video detecting method of claim 14, wherein the target pixel, the reference pixel, the first, second, and third comparing pixels are in a diagonal direction of a frame comprising the corresponding first and second fields.

17. The video detecting method of claim 10, wherein the first scan line is located above the target scan line, and the second scan line is located below the target scan line.

18. The video detecting method of claim 17, wherein the target pixel, the reference pixel, the plurality of first comparing pixels and the plurality of second comparing pixels are in a vertical direction of a frame comprising the corresponding first and second fields.

19. The video detecting method of claim 17, wherein the target pixel, the reference pixel, the plurality of first comparing pixels and the plurality of second comparing pixels are in a diagonal direction of a frame comprising the corresponding first and second fields.

20. The video detecting method of claim 10, further comprising the steps of:
- low-pass filtering pixel data before entering the first pixel detector in order to decrease noise interference in the first pixel detector; and
- low-pass filtering pixel data before entering the second pixel detector in order to decrease noise interference in the second pixel detector.

\* \* \* \* \*